United States Patent [19]

Block

[11] Patent Number: 5,017,075
[45] Date of Patent: May 21, 1991

[54] APPARATUS FOR AUTOMATICALLY TRANSPORTING TEXTILE LAPS TO A COMBER

[75] Inventor: Karl-Heinz Block, Stuttgart, Fed. Rep. of Germany

[73] Assignee: Zinser Textilmaschinen GmbH, Fed. Rep. of Germany

[21] Appl. No.: 424,805

[22] Filed: Oct. 20, 1989

[30] Foreign Application Priority Data

Oct. 25, 1988 [DE] Fed. Rep. of Germany ....... 3836245

[51] Int. Cl.[5] .............................................. B65H 5/14
[52] U.S. Cl. ................................. 414/225; 19/65 A;
198/341; 198/468.2; 212/220; 294/119.1;
294/902; 294/907; 701/6
[58] Field of Search .................... 414/225, 226; 901/9,
901/13, 35, 6; 198/341, 468.2, 464.2, 464.3;
212/220, 221, 161, 153; 294/119.1, 907, 902,
67.33; 19/65 R, 65 A

[56] References Cited

U.S. PATENT DOCUMENTS

| 2,718,321 | 9/1955 | Westermeyer | 294/907 X |
| 3,884,363 | 5/1975 | Ajlouny | 901/13 X |
| 4,176,995 | 12/1979 | Wise | 414/266 |
| 4,252,358 | 2/1981 | Klebs | 294/67.33 |
| 4,287,459 | 9/1981 | Oahlstrom | 901/9 X |
| 4,723,884 | 2/1988 | Brinker et al. | 901/35 X |
| 4,735,042 | 4/1988 | Igel | 57/281 |
| 4,739,611 | 4/1988 | Rohner | 57/276 |
| 4,753,357 | 6/1988 | Miyoshi et al. | 212/161 |
| 4,766,322 | 8/1988 | Hashimoto | 901/35 X |

FOREIGN PATENT DOCUMENTS

| G8328588.1 | 12/1983 | Fed. Rep. of Germany . |
| 3332898A1 | 4/1985 | Fed. Rep. of Germany . |
| 35367021A1 | 4/1987 | Fed. Rep. of Germany . |
| 3532002A1 | 6/1987 | Fed. Rep. of Germany . |
| 3600980A1 | 7/1987 | Fed. Rep. of Germany . |
| 3537727A1 | 5/1988 | Fed. Rep. of Germany . |

Primary Examiner—Robert J. Spar
Assistant Examiner—Donald W. Underwood
Attorney, Agent, or Firm—Shefte, Pinckney & Sawyer

[57] ABSTRACT

In an apparatus for transporting textile laps to a comber, wherein the apparatus includes a bridge structure for traveling movement between a lap storage station and the comber, a trolley movable along the bridge structure, and a lap gripping mechanism suspended from the trolley by an elevating mechanism, sensors are provided for detecting the presence of a lap at the lap storage station and detecting the central supporting tube of the lap for precisely positioning the gripping mechanism at a lowered position at the lap storage station to engage a full replacement lap. A controller is associated with the sensors for controlling subsequent lowering of the gripping mechanism at the comber by the same distance the gripping mechanism was lowered at the storage station to initially receive the replacement lap, thereby to insure that the lap is deposited at the comber safely and gently without damage.

6 Claims, 2 Drawing Sheets

APPARATUS FOR AUTOMATICALLY TRANSPORTING TEXTILE LAPS TO A COMBER

BACKGROUND OF THE INVENTION

The present invention relates broadly to an apparatus for transporting textile laps to a comber and, more particularly, to such a lap transporting apparatus utilizing an elevated bridge structure equipped with a lap gripping device for carrying textile laps from a lap storage station to the work stations of the comber.

Textile laps comprise a loosely compressed batt of cotton fibers produced by a picker, lapper or other suitable lap preparing machinery and wound about a central tubular supporting core. A conventional textile combing machine, commonly referred to as a comber, is typically equipped with a plurality of work stations each of which has a first position at which a wound lap is supported for unwinding from its core for accomplishment of the combing process and a second position at which a full lap is supported for temporary storage awaiting replacement of the active lap at the first position upon its exhaustion.

Lap transporting apparatus of the aforementioned type are known for delivering fully wound laps to the work stations of a series of combers so that the combing operation can progress on a generally continuous basis. Such transporting apparatus provides a trackway extending along the series of combers at an elevation thereabove with the bridge structure supported on the elevated trackway for traveling movement therealong. A trolley is mounted on the bridge structure for traveling movement along its lengthwise extent transverse to the direction of traveling movement of the bridge structure and a lap gripping mechanism is suspended from the trolley by an elevating mechanism for raising and lowering of the gripping mechanism for carrying laps to, and depositing laps at, the work stations of the combers.

SUMMARY OF THE INVENTION

It is an object of the present invention to provide a lap transporting apparatus of the aforementioned type which provides a sufficient supply of full replacement laps at the storage station and which incorporates a suitable system for controlling the lap gripping mechanism to insure a reliable and precise gripping engagement with a fully wound lap at the lap storage station. According to the present invention, this objective is fundamentally achieved by constructing the lap storage station to be capable of storing a plurality of full replacement laps in a serial arrangement and arranging the elevated bridge structure to be movable between the lap storage station and at least one comber. The trolley is movable on the bridge structure to travel along the lap storage station when the bridge structure is positioned thereover and likewise along the comber when the bridge structure is positioned thereover. The gripping mechanism is equipped with a sensor for detecting the presence of a lap at the lap storage station and for generating a corresponding signal. A controller receives the signal generated by the sensor and is associated with the lap gripping device for positioning it centrally with respect to the detected lap.

In this manner, it is possible to maintain several full replacement laps in storage at the lap storage station, with the lap gripping mechanism being enabled itself to locate one of the laps and to position itself precisely with respect to the lap for proper gripping engagement thereof. Accordingly, it is unnecessary for the storage station to be electrically or otherwise connected in any manner to the gripping mechanism for transmission of signals therebetween to enable the gripping mechanism to be properly positioned with respect to a stored lap. Instead, the gripping mechanism is provided with self-contained means for locating a lap and positioning the gripping mechanism to engage the lap without relying on transmitted signals from the storage station.

According to the preferred embodiment of the present invention, the gripping mechanism is provided with another sensor for detecting the presence of a supporting tube about which a lap is wound and for generating a corresponding signal. The controller is also associated with this sensor for receiving its signal and with the drive of the lifting mechanism associated with the gripping mechanism to position gripping elements of the lap gripping mechanism at generally the center of the detected tube. In this manner, the gripping mechanism is enabled to be properly engaged at the lap storage station with laps of differing overall wound diameters in an entirely automatic fashion, which accommodates the circumstance that one of more of the laps stored at the storage station may not have been wound to the normal full overall diameter as may be caused for example by an exhaustion of the material supply to the lap preparing machine. This feature of the present invention enables the gripping mechanism to automatically position itself with respect to the central supporting tube of a lap regardless of its wound diameter so that engagement of the lap may be reliably accomplished without a danger of the gripping mechanism damaging the laps.

According to another feature of the present invention, the controller is programmed with a predetermined distance value representing the distance of elevational travel of the lap gripping mechanism relative to the bridge structure and the trolley between a raised position for normal lap transportation and a lowered position for lap gripping and lap release for a lap of a predetermined wound diameter. The controller is arranged to determine in each case the actual distance traveled by the lap gripping mechanism during lowering into gripping disposition in the center of the supporting tube of a lap at the lap storage station to be transported to the comber and to compare the determined actual distance with the predetermined programmed value. The controller stores any difference between the actual and measured distance values and, in turn, controls the lifting mechanism to lower the lap gripping mechanism the same actual distance during subsequent lowering of the lap gripping mechanism for depositing the lap at the comber. In this manner, the controller assures that laps of varying diameters, including even laps having a relatively small diameter, are reliably deposited at the comber without simply allowing the lap to fall gravitationally from the gripping mechanism to the comber.

Preferably, each sensor comprises an optical device adapted for emitting a light beam for distinguishing bright and dull objects. The first-mentioned sensor for detecting the presence of a lap at the lap storage station is attached to a depending end of one of the gripping elements of the lap gripping device. Each gripping element preferably includes a projecting portion for insertion into the supporting tube of a lap to be gripped, the other sensor adapted for detecting the presence of the supporting tube of a lap being associated with one of the gripping element projecting portions.

DESCRIPTION OF THE PREFERRED EMBODIMENT

Figure 1:
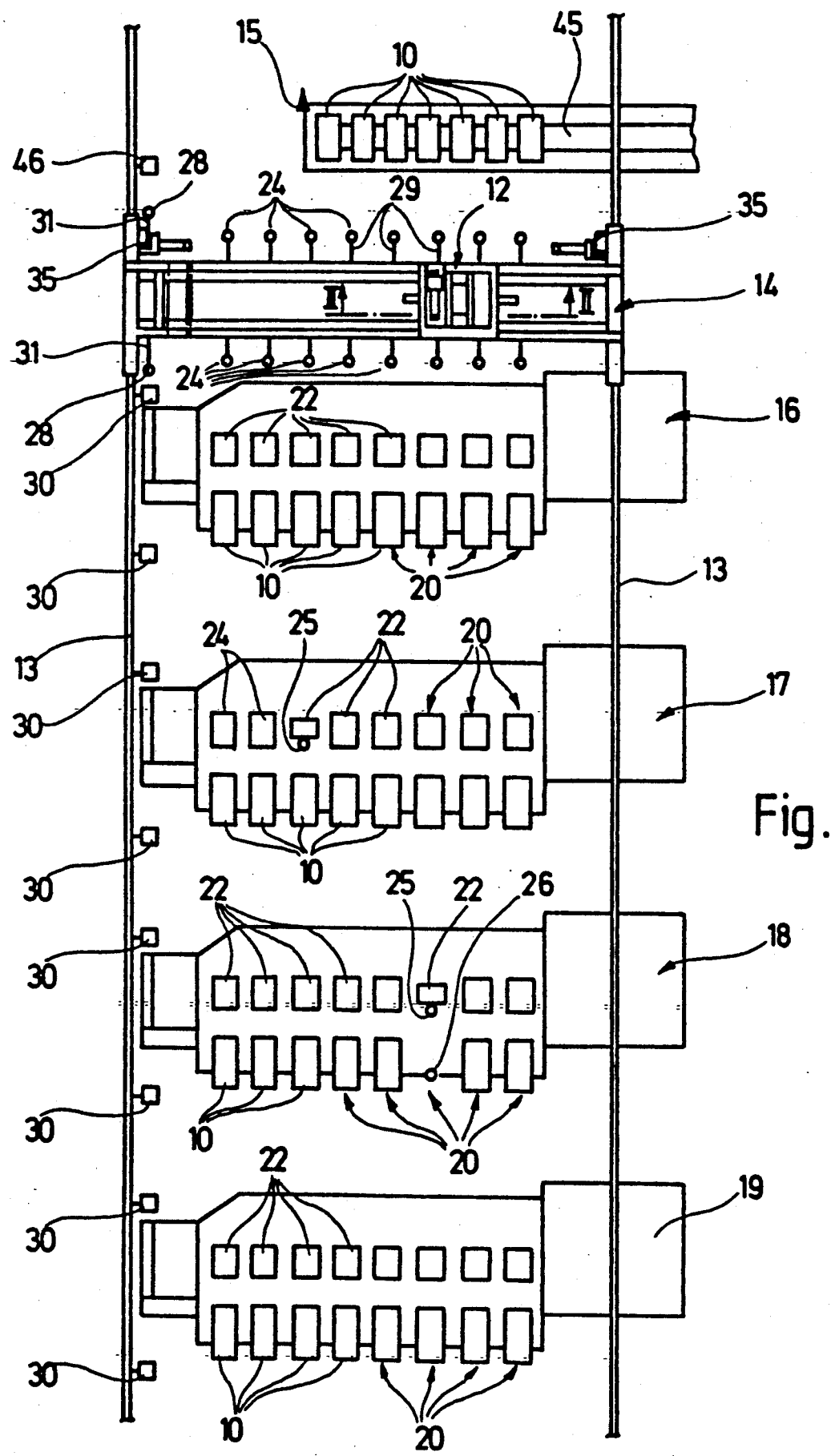
FIG. 1 is a schematic top plan view of a lap transporting apparatus in accordance with the preferred embodiment of the present invention for transporting full replacement laps automatically from a storage station to a plurality of combers.
Figure 2:
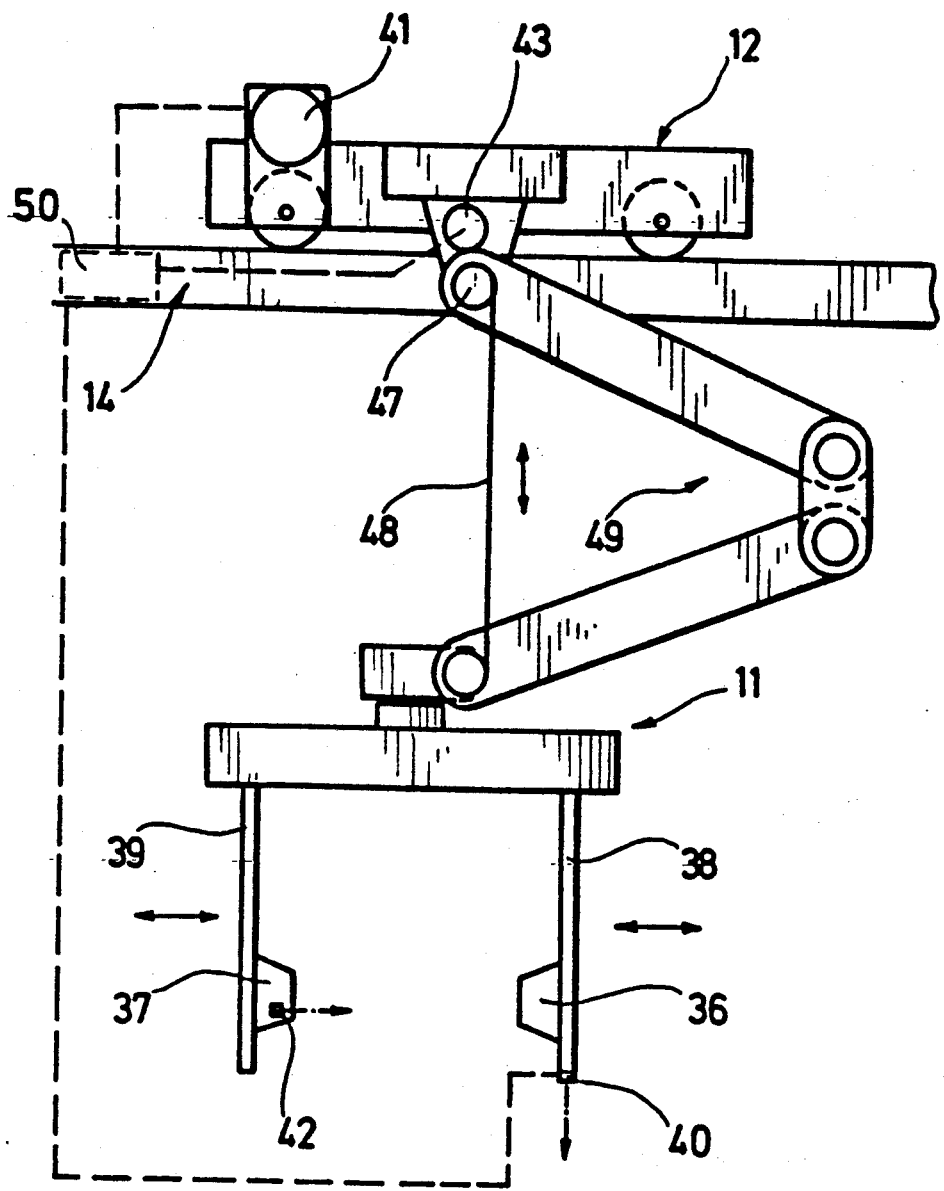
FIG. 2 is a vertical cross-sectional view taken along line II—II of FIG. 1 illustrating the gripping mechanism of the lap transporting apparatus above a full replacement lap at the storage station during lowering of the gripping mechanism into disposition for gripping engagement with the lap.
Figure 2:
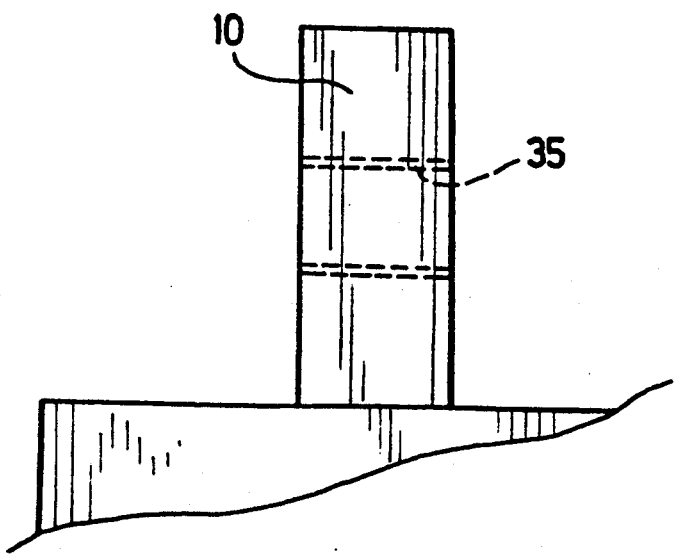

Referring now to the accompanying drawings, FIG. 1 illustrates a bridge structure 14 supported for traveling movement on an elevated trackway 13. A trolley 12 is mounted on the bridge structure 14 for traveling movement along the length thereof and a gripping mechanism 11 is suspended from the trolley 12 by a lifting mechanism 43,47,48,49 (FIG. 2). Several combers 16,17, 18,19 are arranged in side-by-side spaced relation with their respective lengthwise extents parallel to one another. A lap storage station 15 comprises a conveyor belt 45 extending from a lapper or other lap preparing machine (not shown) and is arranged with the lengthwise extent of the conveyor belt 45 in parallel relation to the combers 16,17,18,19 adjacent the comber 16 at one end of the series of combers. The elevated trackway 13 includes a pair of tracks arranged in spaced parallel relation extending transversely with respect to the parallel arrangement of the combers 16,17,18,19 and the lap storage station 15 along opposite ends of the combers. In this manner, the bridge structure 14 can travel along the trackway 13 in sequence over the lap storage station 15 and the combers 16,17,18,19 while the trolley 12 can travel along the bridge structure 14 along the parallel lengthwise extents of the storage station 15 and the combers 16,17,18,19.

The conveyor belt 45 carries a plurality of fully wound laps 10 from the lap preparing machine in a serial arrangement wherein the axial extent of the central supporting tubes 45 (FIG. 2) of the laps is oriented in the longitudinal direction of the conveyor belt 45. The laps 10 on the conveyor belt 45 are arranged at sufficient spacings from one another sufficient to permit the gripping mechanism 11 to engage the laps individually.

Each of the combers 16,17,18,19 includes a plurality of work stations 20 arranged side-by-side at spacings along the lengthwise extent of the comber, i.e., perpendicular to the lengthwise extent of the trackway 13 and parallel to the longitudinal extent of the bridge structure. Each work station 20 includes a lap working position at which a lap 22 is supported in active operation for unwinding delivery to the working components of the comber 23 for the combing operation. Each work station 20 also includes a lap storage position at which a full replacement lap 10 may be supported pending exhaustion of the associated active lap 22 whereupon a machine operator transfers the full replacement lap to the working position.

In basic operation, the bridge structure 14 initially travels to the lap storage station 15 whereat the elevating mechanism is operated to lower the gripping mechanism 11 to grippingly engage a full replacement lap 10 and then to raise the gripping mechanism 11 to take the engaged lap 10 from the storage station 15. The bridge structure 14 then travels back and forth along the trackway 13 until the full replacement lap 10 carried by the gripping mechanism 11 is required at one of the work stations 20 of one of the combers 16,17,18,19. The bridge structure 14 is equipped with a suitable detection and control system by which the bridge structure 14 is enabled to monitor the presence of active and replacement laps 22,10 at the work stations 20 of the several combers 16,17,18,19 so as to determine when a full replacement lap is required at one of the work stations. Such a detection and control system is described in West German Patent Application No. P 38 36 242.2 filed Oct. 25, 1988, and entitled "Transportvorrichtung zum Versorgen von mehreren Kämmaschinen mit Wickeln", and which is the subject of a co-pending United States patent application filed contemporaneously with the present application on Oct. 20, 1990, as U.S. patent application Ser. No. 425,710, entitled Apparatus for Transporting Laps, incorporated herein by reference.

When taking up a full replacement lap 10 at the storage station 15, the bridge structure 14 is positioned along the trackway 13 to be directly above the conveyor 45 of the storage station 15. Detector elements 28 are mounted to the bridge structure 14 at one end thereof and are adapted for recognizing a detectable element 46 mounted to the trackway 13 in general alignment with the storage station 15 whereat the bridge structure 14 is directly above the conveyor belt 45 of the storage station 15 when the detector element 28 recognizes the detectable element 46. Traveling movement of the bridge structure 14 is actuated by drive motors 35 at opposite ends of the bridge structure 14, the detector element 28 being operatively associated with the drive motors 35 to deliver a stop signal thereto when the detectable element 46 is recognized. When the bridge structure 14 travels to the storage station 15 to take up a new full replacement lap 10, the trolley 12 is initially moved to one end of the bridge structure 14, i.e., the leftward end as viewed in FIG. 1, to be disposed at an outward spacing from the terminal end of the conveyor belt 45. When the bridge structure 14 is stopped at the storage station 15, the trolley 12 is then moved along the bridge structure 14 toward the adjacent end of the conveyor belt 45 to initiate the operation of the gripping mechanism 11 to engage and take up a new full replacement lap 10.

As best seen in FIG. 2, the gripping mechanism 11 includes a pair of gripping arms 38,39 which are movable horizontally toward and away from one another, as indicated by the directional arrows, by suitable drive means such as a pneumatic drive (not shown). Each of the gripping arms 38,39 is equipped with a conical gripping member 36,37, respectively, facing and projecting toward one another. As aforementioned, the gripping mechanism 11 is suspended from the trolley 12 by a lifting mechanism comprising a drive motor 43 which operates a chain sprocket 47 for winding thereon and unwinding therefrom an elevating chain 48. The elevating mechanism further includes a compensating lever assembly 49 mounted at opposite ends to the trolley 12 and the gripping mechanism 11 for continuously maintaining the gripping mechanism 11 in a precisely horizontal disposition.

According to the present invention, a sensor element 40 is mounted at the lower end of the gripping element 38 to be downwardly directed for detecting objects below the gripping mechanism 11. The sensor element 40 preferably is an optical device such as a light probe adapted to emit a light beam and receive its reflection and capable of distinguishing the brightness or dullness of the reflected light. Thus, as illustrated in FIG. 2, when the bridge structure 14 is positioned directly above the lap storage station 15 and the trolley 12 is actuated to travel along the bridge structure 14 toward the conveyor belt 45 of the storage station 15, the sensor element 40 recognizes the first full replacement lap 10 positioned most closely adjacent the terminal end of the conveyor belt 45 as soon as the sensor element 40 passes directly above the end of the first lap 10 facing the terminal end of the conveyor belt 45. The traveling movement of the trolley 12 is actuated by a drive motor 41 which, in turn, is controlled by a controller 50 provided on the bridge structure 14. The sensor element 40 is arranged to deliver a signal to the controller 50 representing the initial recognition by the sensor element 40 of the first full replacement lap 10 at the storage station 15. Following receipt of such signal, the controller 50 continues the actuation of the drive motor 41 for a predetermined additional time stored in the controller 50 for further movement of the trolley 12 along the bridge structure 14 corresponding to a dimension equal to the sum of one-half the spacing of the gripping arms 38,39 from one another and one-half the uniform axial dimension of the full replacement laps 10, whereupon the controller 50 then deactuates the further operation of the trolley drive motor 41. In this manner, the sensor element 40 in conjunction with the controller 50 insures that the trolley 12 is stopped at a position wherein the gripping mechanism 11 is precisely positioned centrally over the first full replacement lap 10 at the lap storage station 15. During this traveling movement of the trolley 12 into position over the first replacement lap 10 on the conveyor belt 45, the gripping mechanism 11 may be retained in a fully raised position by the elevating mechanism, but it is considered more advantageous if the gripping mechanism 11 is lowered beforehand into a position immediately vertically above the area occupied by the full replacement laps 10 on the conveyor belt 45 as shown in FIG. 2.

When the trolley drive motor 41 is stopped to position the gripping mechanism 11 precisely centrally above the first full replacement lap 10 at the storage station 15, the drive motor 43 of the elevating mechanism is actuated to lower the gripping mechanism 11 to position its gripping arms 38,39 adjacent the opposite ends of the first lap 10. The conical projection 37 on the gripping arm 39 is provided with another sensor element 42 directed toward the conical projection 36 of the gripping arm 38. The conical projection 37 of the gripping arm 38 is preferably of a tubular or other hollow construction with the sensor element 42 being disposed within the interior thereof. The sensor element 42 is also preferably in the form of a light probe or other suitable optical light transmitting and receiving device reactive to brightness and darkness. Accordingly, the sensor 42 recognizes when the conical projection 37 (and, in turn, when the conical projection 36) is lowered to the level of the uppermost periphery of the first lap 10 as a result of the corresponding brightness of the light reflection therefrom and also recognizes when the conical projections 37,36 are lowered to the level of the supporting tube 35 of the lap 10 as a result of the correspondingly dark light reflection therefrom. The controller 50 maintains the actuation of the elevating drive motor 43 for a predetermined additional time period stored in the controller 50 corresponding to the radius of the supporting tubes 35 of the laps 10, whereupon the controller 50 deactuates the elevating drive motor 43, thereby positioning the conical projections 37,36 substantially coaxially with the supporting tube 35.

Once the gripping mechanism has been thusly positioned, the gripping mechanism 11 is closed by actuating movement of the gripping arms 38,39 toward one another to insert the conical projections 36,37 into the respective opposite ends of the supporting tube 35 of the lap 10 thereby securely engaging the lap 10 by the gripping mechanism 11. The elevating drive motor 43 is then reactuated to raise the gripping mechanism 11 to its original fully raised position, the gripping mechanism 11 carrying with it the replacement lap 10. The drive motors 35 of the bridge structure 14 are then reactuated to travel back and forth along the trackway 13 while monitoring the work stations 20 of the combers 16,17,18,19 for subsequent deposit of the lap 10 carried by the gripping mechanism 11 at one of the work stations 20.

The controller 50 is also programmed with a predetermined value representing the distance the gripping mechanism 11 travels downwardly from its fully raised disposition to its disposition wherein the conical projections 36,27 are coaxial with the central supporting tube 35 of a lap 10 of a predetermined average fully wound diameter. The actual distance the gripping mechanism 11 is lowered during a lap engaging cycle is also determined by the controller 50, compared with the predetermined stored value, and any difference therebetween is calculated and stored by the controller 50. During subsequent lowering of the gripping mechanism 11 to deposit the lap 10 held by the gripping mechanism 11 at a working station 20 of one of the combers 16,17,18,19, the controller 50 controls the drive motor 43 of the elevating mechanism to lower the gripping mechanism 11 by precisely the same distance before separating the gripping arms 38,39 to release the lap 10 so that the gripping mechanism 11 is not lowered by too great or too small a distance, thereby insuring that the lap 10 is deposited safely and gently at the work station of the comber without dropping or damaging the lap. Further, this control system insures that all laps whether wound to a full normal diameter or to less than full diameter are safely handled by the gripping mechanism.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

I claim:

1. In combination with a textile comber having a plurality of generally aligned work stations each adapted for supporting a textile lap thereat, apparatus for automatically transporting textile laps wound on supporting tubes to the work stations of the comber, said transporting apparatus comprising a lap storage station for storing a plurality of laps in a serial arrangement, an elevated bridge structure movable between the lap storage station and the comber, a trolley movable along the bridge structure transversely with respect to the direction of movement of the bridge structure for movement along the aligned work stations of the comber, a drive motor associated with the trolley for actuating movement thereof, a lap gripping device having gripping elements for gripping engagement with the supporting tube of a lap to be transported, a lifting device supporting the lap gripping device in suspended relation from the trolley, a drive motor associated with the lifting device for lowering the lifting device to position the lap gripping device for engaging a lap to be transported at the storage station and for depositing the lap at the comber and for raising the lifting device during transport between the storage station and the comber, a first sensor associated with the lap gripping device for detecting the presence of a lap at the lap storage station and generating a corresponding signal, another sensor associated with the lap gripping device for detecting the presence of the supporting tube of a lap and generating a corresponding signal, and a controller for receiving the signals generated by the sensors, the controller being associated with the drive motor of the trolley for positioning of the lap gripping device centrally with respect to the detected lap and the controller being associated with the drive motor of the lifting device for positioning the gripping elements of the lap gripping device at generally the center of the detected tube.

2. Apparatus for automatically transporting textile laps according to claim 1 and characterized further in that the controller is programmed with a predetermined distance value representing the distance of travel of the lap gripping device from a raised position thereof for lap transport to a lowered position thereof for lap gripping and lap release for a lap of a predetermined diameter, the controller being arranged to determine the actual distance traveled by the lap gripping device during lowering into gripping disposition at generally the center of the tube of a lap to be transported, comparing the determined distance with the predetermined value, storing any difference therebetween, and controlling the lifting motor of the lifting device to lower the lap gripping device the same actual distance during subsequent lowering of the lap gripping device for depositing the lap at the comber.

3. Apparatus for automatically transporting textile laps according to claim 1 and characterized further in that the first sensor comprises an optical device adapted for emitting a light beam for distinguishing bright and dull objects.

4. Apparatus for automatically transporting textile laps according to claim 1 and characterized further in that each sensor comprises an optical device adapted for emitting a light beam for distinguishing bright and dull objects.

5. Apparatus for automatically transporting textile laps according to claim 1 and characterized further in that the first sensor is attached to a depending end of one of the gripping elements of the lap gripping device.

6. Apparatus for automatically transporting textile laps according to claim 1 and characterized further in that each gripping element includes a projecting portion for insertion into the supporting tube of a lap to be gripped, the another sensor being associated with one of the projecting portions.

* * * * *